United States Patent
Karmie et al.

(10) Patent No.: US 9,194,086 B1
(45) Date of Patent: Nov. 24, 2015

(54) SYSTEM AND METHOD FOR ABSORBING SHOCKS IMPACTS WHILE PROVIDING WATER DRAINAGE

(71) Applicants: Dale Karmie, Uniontown, OH (US); Brian Karmie, Uniontown, OH (US); Ty Allen, Uniontown, OH (US); Davis Lee, Uniontown, OH (US)

(72) Inventors: Dale Karmie, Uniontown, OH (US); Brian Karmie, Uniontown, OH (US); Ty Allen, Uniontown, OH (US); Davis Lee, Uniontown, OH (US)

( * ) Notice: Subject to any disclaimer, the term of this patent is extended or adjusted under 35 U.S.C. 154(b) by 0 days.

(21) Appl. No.: 13/742,826

(22) Filed: Jan. 16, 2013

Related U.S. Application Data (60) Provisional application No. 61/587,050, filed on Jan. 16, 2012.

(51) Int. Cl.
*B32B 9/00* (2006.01)
*E01C 13/08* (2006.01)

(52) U.S. Cl.
CPC .............. *E01C 13/083* (2013.01); *E01C 13/08* (2013.01)

(58) Field of Classification Search
USPC .................... 405/302.4, 302.6, 302.7, 15, 36; 428/117, 17
See application file for complete search history.

(56) References Cited

U.S. PATENT DOCUMENTS

| | | |
|---|---|---|
| 3,900,656 A | 8/1975 | Schmidt et al. |
| 4,161,558 A | 7/1979 | See |
| 4,337,283 A | 6/1982 | Haas |
| 4,497,853 A | 2/1985 | Tomarin |
| 4,637,942 A | 1/1987 | Tomarin |
| 5,250,340 A | 10/1993 | Bohnhoff et al. |
| 5,514,722 A | 5/1996 | Di Geronimo et al. |
| 5,605,721 A | 2/1997 | Di Geronimo et al. |
| 5,616,399 A | 4/1997 | Theisen |
| 5,976,645 A | 11/1999 | Daluise et al. |
| 6,221,445 B1 | 4/2001 | Jones |
| 6,602,113 B2 | 8/2003 | Lemieux |
| 6,740,387 B1 | 5/2004 | Lemieux |
| 6,786,674 B1 | 9/2004 | Hanks |
| 6,796,096 B1 | 9/2004 | Heath |
| 6,877,932 B2 | 4/2005 | Prevost |
| 7,014,390 B1 | 3/2006 | Morris |
| 7,186,450 B2 | 3/2007 | Foxon |
| 7,189,445 B2 | 3/2007 | Knox |
| 7,279,212 B2 | 10/2007 | Foxon |
| 7,341,401 B2 | 3/2008 | Blackwood |
| 7,585,555 B2 | 9/2009 | Stroppiana |
| 7,758,281 B2 | 7/2010 | Knox |
| 8,062,143 B1 * | 11/2011 | Meersman ................ 473/173 |
| 2005/0048225 A1 * | 3/2005 | Morris et al. ................ 428/17 |
| 2006/0084513 A1 * | 4/2006 | De Vries et al. ............. 472/92 |
| 2009/0324346 A1 | 12/2009 | Milton et al. |

OTHER PUBLICATIONS

Dupont, "DuPont™ GroundGrid® Ground Stabilization System," www2.dupont.com/Landscape_Solutions/en_US/Our_Products/Geotextiles/Ground_Grid.html, accessed Jan. 15, 2012.

* cited by examiner

(74) *Attorney, Agent, or Firm* — Smith Risley Tempel Santos LLC; Steven P. Wigmore (57) ABSTRACT

A vertically draining, particulate confinement structure may prevent side to side migration of particulate materials and may provide a way to ensure a consistent fill depth of the particulate materials. The particulate materials may include rubber granules. The vertical draining feature of the system may prevent water from accumulating on the turf surface by providing adequate vertical drainage. The vertical draining feature may be attributed to the combination of the turf surface with a confinement structure and the particulate materials that support this turf surface. The confinement structure and particulate materials also inhibit underlayment migration of the turf surface.

4 Claims, 7 Drawing Sheets

PREPARE— Use an appropriate substrate material. — 305

FIG. 3B

PLACE— Lay the GroundGrid fabric over the surface. Secure every several feet to prevent lifting. — 310, 320

FIG. 3C

FILL— Pour infill on surface and rake into place. — 330

SYSTEM AND METHOD FOR ABSORBING SHOCKS IMPACTS WHILE PROVIDING WATER DRAINAGE

PRIORITY AND RELATED APPLICATIONS STATEMENT

This application claims priority under 35 U.S.C. 119(e) to U.S. Provisional Patent Application filed on Jan. 16, 2012, assigned Provisional Application Ser. No. 61/587,050, and entitled "SYSTEM AND METHOD FOR ABSORBING SHOCK/IMPACT/(S) WHILE PROVIDING WATER DRAINAGE." The entire contents of this provisional patent application are hereby incorporated by reference.

DESCRIPTION OF THE RELATED ART

Artificial turf has long been used in athletic venues, residential and commercial landscapes and playgrounds. It is a general object of such surfaces to mimic natural grass turfs while eliminating the high maintenance required and poor durability of the same. However, much attention has been given to head injury from falls on playgrounds and sports surfaces. As a result, the Consumer Products Safety Commission of the United States has issued guidelines and standards for playground surfaces.

Two testing methods are used to determine the fall safety of surfaces. GMax is one method which holds that if the peak deceleration of a human head during impact does not exceed 200 times the acceleration due to gravity (200 G's), a life threatening head injury is not likely to occur. The second method holds that both the deceleration of the head during impact and the time duration over which the head decelerates to a halt are significant in assessing head impact injury.

This latter method uses a mathematical formula to derive a value known as Head Injury Criteria (HIC) [NOTE: Collantes, Margaritsa, Evaluation of the Importance of Using Head Injury Criterion (HIC) to Estimate the Likelihood of Head Impact Injury as a Result of a Fall Onto Playground Surface Materials; U.S. Consumer Product Safety Commission, Washington, D.C. 20207, October 1990.] Head impact injuries are not believed to be life threatening if the HIC does not exceed a value of 1,000.

The most widely used test method for evaluating the shock absorbing properties of a playground surfacing material is to drop an instrumented metal head-form onto a sample of the material and record the acceleration/time pulse during the impact. Such a method is described in an ASTM Standard Specification for Impact Attenuation of Surface Systems Under and Around Playground Equipment, ASTM F1292. [ASTM, 1916 Race Street, Philadelphia, Pa. 19103.]

Artificial turf filled with a mixture of sand and rubber has been shown to address many of these problems by reducing the potential for certain turf-induced injuries. Some conventional systems use an artificial turf comprising a subsurface, a pile fabric having a flexible backing on the subsurface, and a compacted top-dressing or infill layer comprising a mixture of resilient particles, such as rubber, and fine sand.

The purpose of the top-dressing layer is to stabilize the pile elements, prevent graininess (i.e., prevent the tendency of the pile fabric to lay in a given direction), absorb shock, and improve the footing of a player running or walking across the surface. Although the use of a sand/rubber infill offers some measure of shock absorption it is not adequate for playground surfaces since HIC cannot be met with granular infill material alone.

Moreover the top dressing infill layer can be a nuisance. When children or athletes play on the synthetic turf infill, particulate frequently gets into the shoes or clothing causing discomfort or irritation. It is desirable to provide an artificial turf which reduces or eliminates the need for a top dressing infill layer while at the same time maintaining the ability to absorb shock. This is especially true for children's play areas. In these cases, it may be necessary to provide an increased level of shock attenuation.

There have been various approaches to create a resilient underlayment that will attenuate shock. In some cases, crumb rubber has been used as an underlayment. While this is a cost effective approach loose crumb rubber underneath the turf is mobile and can have side to side migration. The artificial turf surface can thus develop undesirable undulations and an uneven and unsightly surface.

Other approaches try to solve this problem by adding binder materials to a crumb rubber underlayment composition. While this can be effective, this approach can be difficult and time consuming to install. In addition, it is not possible to insure that the underlayment provides adequate drainage for an outdoor installation such as would be experienced during a rainfall.

Other conventional solutions have used underlayment pads that can include a relatively thick mat laid upon a support base surface, with the mat being formed of loosely felted, somewhat springy, coarse coconut hair fibers, so that the mat resiliently resists compacting. Such solutions may further include a filling of generally coarse sand granules which substantially fill the interstices between the mat fibers, wherein the filled mat forms a shock absorbent, compact resistant layer over the support base surface. This approach does not incorporate elastomeric materials so it offers inadequate shock attenuation. And because it is assembled from natural materials it will deteriorate and degrade over a relatively short period of time.

More recently resilient shock pads have been incorporated as a synthetic turf underlayment to improve shock attenuation, mitigate crumb rubber migration and provide long life. Some conventional solutions may use a shock pad of post industrial, recycled closed cell foam in conjunction with an impervious wear surface such as rubber, sprayed polyurethane, or artificial turf. While shock attenuation can be improved, water drainage is inadequate for an outdoor installation where rainfall occurs.

These conventional approaches, while adequate for improving the ability to absorb shock, all suffer from inadequate drainage of water from rainfall, increased installation difficulty, increased time required for installation, and overall increased cost.

SUMMARY OF THE DISCLOSURE

The problems of the prior art have been overcome by the inventive system, which provides a vertically draining, particulate confinement structure that prevents side to side migration of particulate materials and that provides a way to ensure a consistent fill depth of the particulate materials. In one exemplary embodiment, the particulate materials may comprise rubber granules. The vertical draining feature of the system may prevent water from accumulating on the turf surface by providing adequate vertical drainage.

The vertical draining feature may be attributed to the combination of the turf surface with a confinement structure and the particulate materials that support this turf surface. The confinement structure and particulate materials also inhibit underlayment migration of the turf surface which could result in undesirable undulations and an uneven and unsightly turf surface. In addition, the system provides a way to ensure consistent particulate material fill depth, which facilitates uniform shock attenuation that will be maintained across the entire and outer surface of the system.

DETAILED DESCRIPTION

Figure 1A:
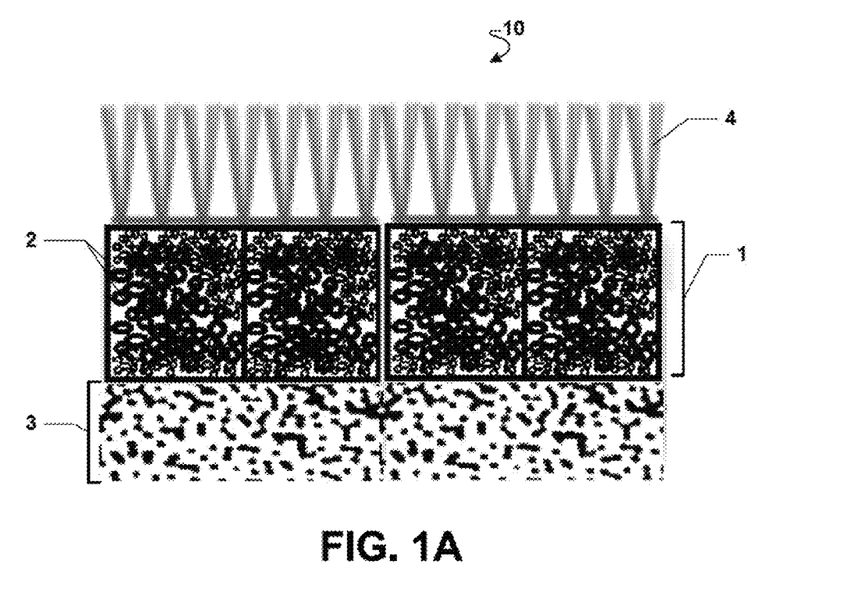
FIG. 1A is a cross-sectional view of a system that provides a vertically draining, particulate confinement structure that prevents side to side migration of particulate materials.

Referring to FIG. 1A, the underlayment of the system 10 incorporates a three dimensional confinement structure 1 for filler material 2 comprising sub-assemblies; each made up of a plurality of interconnected open cells of fabric material (See FIG. 1B) that have openings in the vertical dimension relative to a horizontal surface, such as the earth. An exemplary embodiment of the confinement structure 1 is sold under the tradename GroundGrid® Ground Stabilization System, manufactured by DuPont.

Figure 1B:
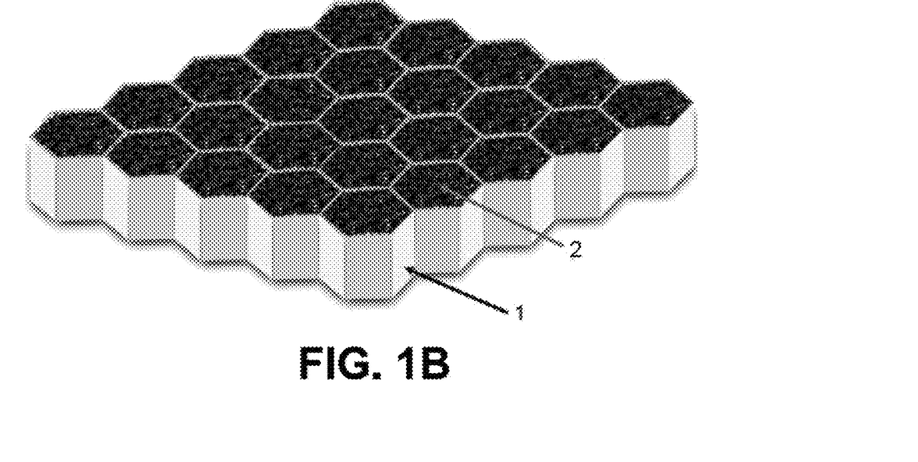
FIG. 1B is a three dimensional view of the confinement structure with particulate filler.
Figure 2A:
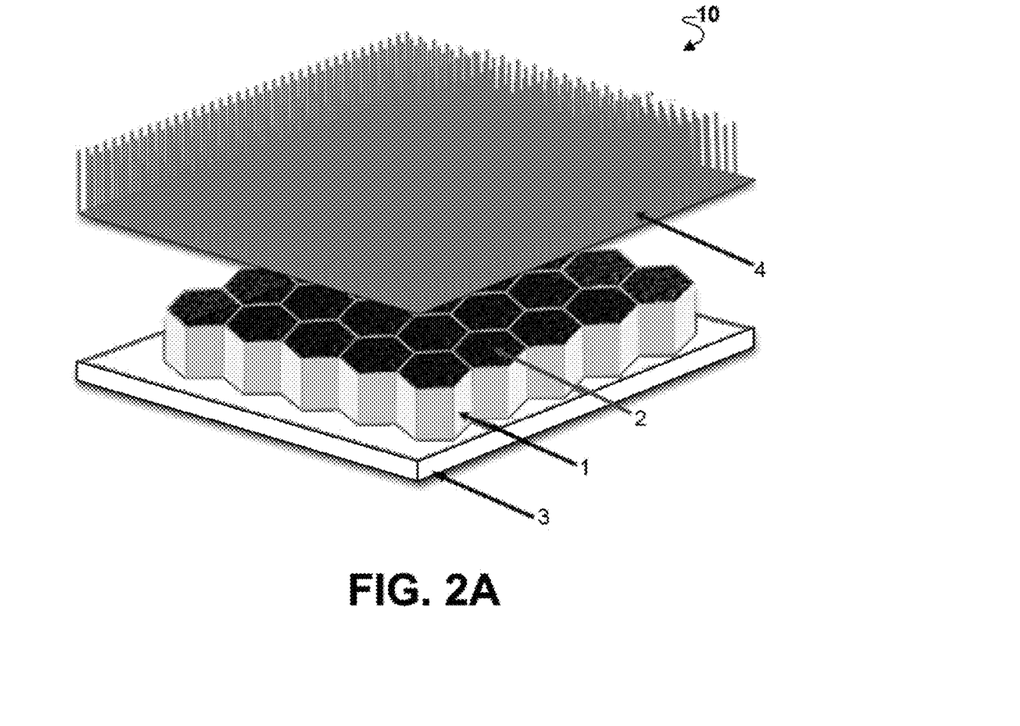
FIG. 2A is a schematic view of a synthetic turf positioned over the confinement structure with particulate filler which is installed over a prepared base.

The three dimensional confinement structure 1 as illustrated in FIGS. 1B and 2A is usually constructed from a nonwoven fabric. It is laid over a prepared base 3 and anchored on one end. The base 3 may comprise: about a ¼" (0.25 inch) crushed fine gravel or decomposed granite added to a stabilized about 1.0 to about 4.0 inches sub-base. Crushed gravel may be spread and compacted to create an about 3.0 inch height base 3. In other exemplary embodiments, the base may have a thickness that ranges from about 1.0 inches to about 6.0 inches, and preferably about 2.0 inches in height. In some instances, base 3 may be omitted from the system 10. For example, base 3 may be omitted if the system 10 is to be provided on a surface comprising concrete.

Meanwhile, the confinement structure 1 may have thickness that ranges between about 0.5 of an inch to about 5.0 inches. More preferably, the confinement structure may have thickness that lies between about 2.0 inches to about 4.0 inches.

Particulate filler 2, as illustrated in FIGS. 1A-1B and 2A, is placed into the three dimensional confinement structure 1 at a depth that is equivalent to the top of the structure 1 in the vertical dimension, usually which is about two inches (but the range of the vertical dimension for the structure may comprise between about ¼ (0.25) of an inch to about 5.0 inches). The turf 4 may have a thickness that ranges between about 1.0 to about 3.0 inches, and preferably, from about 1.75 inches to about 2.25 inches as illustrated in FIG. 1.

Particulate filler 2 may comprise any type of elastomeric material such as styrene-butadiene rubber, butyl rubber, cis-polyisoprene rubber, neoprene rubber, nitrile rubber, ethylene propylene diene monomer, polyurethane, elastomeric polyester and other similar materials. The diameter of such particulate fillers is usually about ⅜" inch, however, diameters larger or smaller are within the scope of this disclosure.

Particulate filler 2 of other synthetic polymers not normally considered to be elastomers may also be used as the particulate filler 2. These include the vinyls, e.g., vinyl chloride, vinyl ethers, vinyl acetate etc., the acrylates and methacrylates, polyvinylidene chloride, urethanes, polyethylene, polypropylene, polystyrene, polyamides and polyesters. Inorganic aggregate such as sand and gravel that has been coated with an elastomeric coating such as polyurethane, acrylic, vinyl and polyester may also be used.

The size of the particulate filler 2 may vary between about 4.0 to about 70.0 U.S. screen mesh size. Preferably, the particulate filler 2 will lie between about 6.0 to about 60.0 U.S. screen mesh size.

It is also possible to use a mixture of particulate fillers 2 of two or more different materials. For example, a mixture of rubber and sand particulate may be used to adjust drainage and resiliency characteristics for the system. When sand is utilized as the particulate filler 2, then generally sand smaller in size than 30.0 U.S. screen mesh size is used. Preferably, sand between about 40.0 to about 200.0 U.S. screen mesh size is used for the particulate filler 2. The figures of this disclosure illustrate a mixture of particulate fillers having different diameters and screen mesh size. One of ordinary skill in the art recognizes that the cross-sectional view of each granule for a particular filler 2 would be uniform if only one type of material and size were used in an exemplary embodiment.

Other three dimensional confinement structures 1 than those illustrated in FIGS. 1B-2A 1 may be used. Other three dimensional confinement structures 1 may have the same or similar dimensions but with alternative cellular geometries than those illustrated in FIGS. 1B-2A. Alternative cellular geometries include, but are not limited to, circles, triangles, quadrilateral shapes such as squares, rectangles and diamonds, pentagons and octagons.

Three dimensional geotextiles that have a waffle shaped thick three-dimensional cusp shaped profile such as is disclosed in U.S. Pat. No. 5,616,399 (which is hereby incorporated by reference) may also be used for the three dimensional confinement structure 1. Geocells, three dimensional, expandable panels made from high density polyethylene, polyester, or other polymer material may be used for the confinement structure 1. Examples of such structures 1 include Matrix and Erocells produced by Fiber web, EGA produced by Geo Products LLC, Huitex produced by Huikwang Corp, Geoweb produced by Presto Products Co., SCC produced by Strata Systems Inc. and Tenax Tenweb produced by Syntec. Other similar structures may also be used without departing from this disclosure.

For example, other structures for the confinement structure 1 besides those listed above, may include an elastomeric or foam panel with open cells. These cells can be filled with elastomeric particulate 2 and such a structure 1 could be used instead of the geotextile fabric for the confinement structure 1.

The synthetic turf 4 that may be used may comprise any of the following artificial turfs sold by ForeverLawn, Inc. located in Ohio as listed in Table 1 provided below.

The several figures also illustrate the synthetic turf 4, the three dimensional confinement structure 1, and prepare base 3 having very similar or close thickness dimensions. The dimensions provided in the figures have been exaggerated for clarity and for teaching purposes.

Figure 2B:
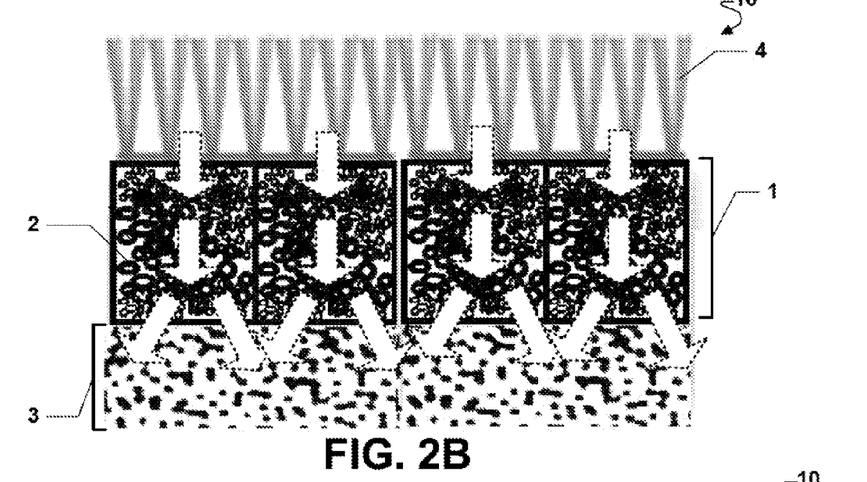
FIG. 2B illustrates water drainage through the system.
Figure 2C:
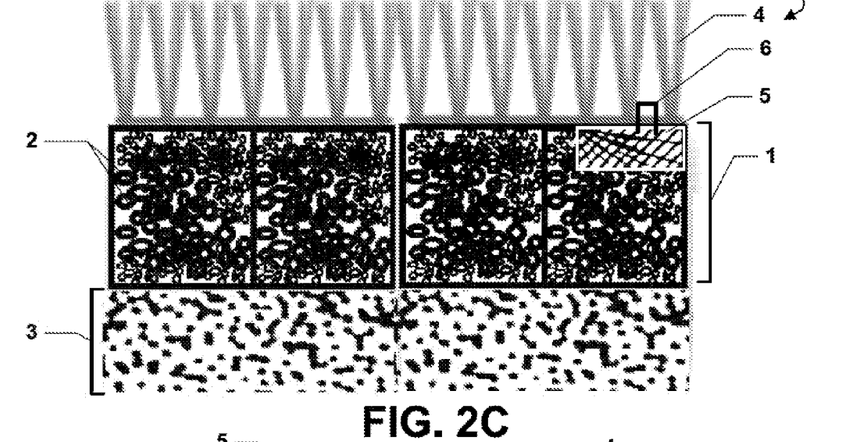
FIG. 2C illustrates how both the synthetic turf and confinement structure may be secured.

FIG. 2B illustrates water drainage through the system 10. Specifically, the arrows penetrating the turf 4, confinement structure 1, and base 3 illustrate the direction that water from rainfall or other sources may take through the system 10. Water from rain may enter the top turf 4 and then flow through that layer to the particulate filler 2 contained by the confinement structure 1. The water flows through the particulate filler 2 and then into the base 3 in which the water spreads out and disperses within the base layer 3.

structure 1 may be secured. According to this exemplary embodiment, the system 10 comprises one or more staples 6 that penetrate through the turf 4 to couple to a nailer board 5. The staples 6 may be made from stainless steel and may be galvanized. The staples 6 may comprise about ¼" inch to about ½" inch in length, and in some instances, about 1" inch in length.

The nailer board 5 may comprise a standard wood 2"×4" as understood by one of ordinary skill in the art. The nailer board 5 may also comprise a composite material. The nailer board 5 may be oriented so that its longer side is in the vertical position relative to the earth. Generally, the nailer boards 5 are provided on the periphery or outline of a two-dimensional space.

For example, for a square-shaped or rectangular area, the nailer boards 5 would be provided on the edges or border of the square-shaped area such that the boards 5 would define the perimeter of the area. See FIG. 2D which illustrates the nailer boards 5 provided on the periphery of a two dimensional space occupied by the synthetic turf 4. The boards 5 in this figure have been illustrated with dashed lines to convey that they are hidden from view under the turf 4. The dashed arrows adjacent to the boards 5 and staples 6 convey that the staples 6 are continuously positioned within the boards 5 along their length.

TABLE 1

SYNTHETIC TURF 4

| Components | Playground Grass Extreme | Playground Grass Discovery | Playground Grass Academy | Playground Grass Ultra |
|---|---|---|---|---|
| Yarn Type | Dual primaries: Polyethylene XP slit file straight and curled | Primary: Polyethylene XP slit film Secondary: Heat set textured nylon monofilament | Primary: Polyethylene XP slit film Secondary: Heat set textured nylon monofilament | Primary: Polyethylene XP slit film Secondary: Heat set textured nylon monofilament |
| Yarn Color | Field/lime green | Primary: Field green Secondary: Turf green | Primary: Field green Secondary: Turf green/tan blend | Primary: Olive green Secondary: Turf green/tan blend |
| Yarn Count | 5,040/1 | Primary: 5,040/1 Secondary: 4,200/8 | Primary: 5,040/1 Secondary: 5,040/12 | Primary: 5,040/1 Secondary: 4,200/8 |
| Tufting Construction | Dual primaries, same row | Dual yarn, alternating rows | Dual yarn, same row | Dual yarn, same row |
| Blade Height | 1⅜" | 1" | 1¾" | 1½" |
| Tufting Gauge | ⅜" | 3/16" | ⅜" | ⅜" |
| Face Weight | 45 ounces | 53 ounces | 48 ounces | 48 ounces |
| Total Product Weight | 105 ounces | 113 ounces | 108 ounces | 108 ounces |
| Backing | 3-layer backing with geotex laminate | 3-layer backing with geotex laminate | 3-layer backing with geotex laminate | 3-layer backing with geotex laminate |
| Antistatic Technology | No | No | No | XStaticTM proprietary patent pending antistatic technology |
| Antimicrobial Protection | No | No | No | Yes |
| Seaming | Micromechanical bonding | Micromechanical bonding | Micromechanical bonding | Micromechanical bonding |
| Infill | 0.75 pounds of rubber | optional | 0.75 pounds of rubber | 0.75 pounds of rubber |

FIG. 2C is a cross-sectional view of the system 10 and it illustrates how both the synthetic turf 4 and the confinement However, as appropriate, intermediate boards 5 may be provided within an area as understood by one of ordinary skill in the art. Other fasteners, besides staples 6 and boards 5, like screws, nails, tacks, adhesives like glue, spikes, hook and loop fasteners, may be used without departing from the scope of this disclosure.

Typically, the boards 5 may be attached to a sidewalk, building, curb, or if in an open area, will be anchored to some type of rebar or metal stake. Once the perimeter of the area to be covered is defined, the confinement structure 1 is spread out or expanded. Usually, the confinement structure 1 does not need to be attached to the boards 5, but sometimes the confinement structure may open/expand easier and holds in place better if it is stapled it to the boards 5.

Once it is opened up, the confinement structure 1 is then filled with the particulate filler 2. Finally, the turf 4 may be laid over the area and attached to the boards 5 with the fasteners 6 noted above. In many exemplary embodiments, the turf 4 is usually not attached to the confinement structure 1: the turf 4 usually just lays over the confinement structure 1.

Figure 3A:
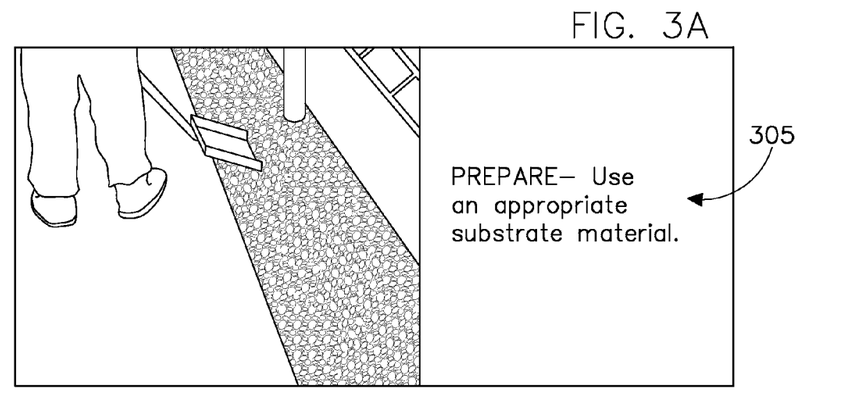
FIG. 3A illustrates an exemplary step of a method for installing the system.
Figure 3B:
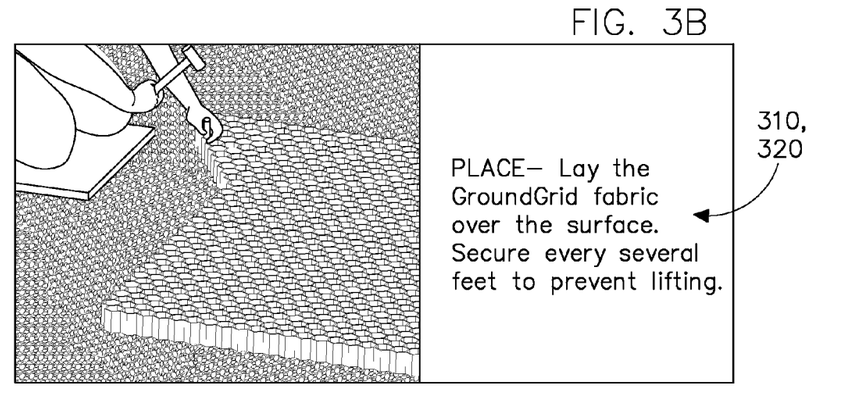
FIG. 3B illustrates exemplary steps that occur after the step of FIG. 3A of the method for installing the system.
Figure 3C:
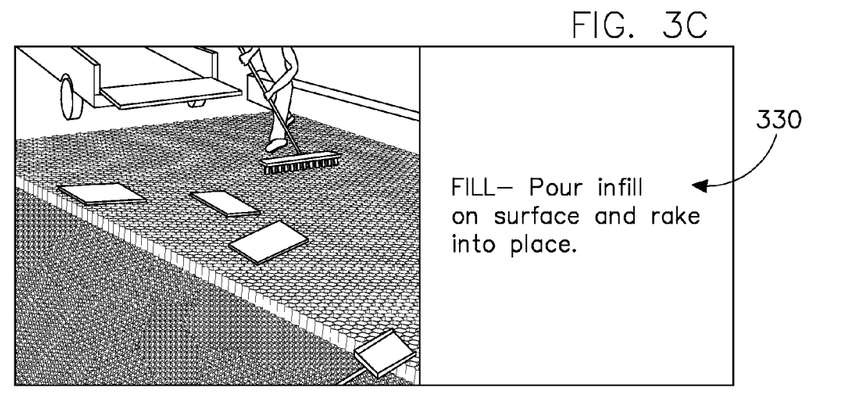
FIG. 3C illustrates an exemplary step that occurs after the steps of FIG. 3B of the method for installing the system.

FIGS. 3A-3C illustrate some exemplary steps of a method 300 (See FIG. 3G for complete method) for installing the system 10. Step 305 of FIG. 3A generally refers to preparing an appropriate base 3 using one or more different materials. This step 305 may include spreading the 0.25 crushed fine gravel or decomposed granite which may be added to a stabilized about 3.0 inches to about 4.0 inches sub-base. Step 305 in FIG. 3A corresponds with a worker taking an appropriate tool, such as a shovel rake, and spreading the material forming the base 3. Step 305 may also include spreading crushed gravel and compacting it to create a base 3 having a height of approximately 3.0 inches.

Steps 310, 320 in FIG. 3B generally correspond to laying down the confinement structure 1 across an area of interest. According to one exemplary embodiment, the confinement structure 1 is manufactured in strips that may be expanded or opened up in an accordion-like are fan-like manner. One strip when it is opened up were spread out may cover an area of approximately 107.0 square feet. However, one of ordinary skill the art recognizes that other areas greater or less than 107.0 square feet can be made and used without departing from the scope of this disclosure. How the confinement structure 1 is secured to the prepared base 3 is described in detail below in connection with FIGS. 3D-3F.

Step 330 in FIG. 3C generally corresponds with spreading the particulate filler 2 into the confinement structure 1. How the particulate filler 2 is spread into the confinement structure 1 depends on the size of the area of interest. For smaller areas of interest, a 50 pound bag of rubber may be poured into each cell of the confinement structure 1 and may be spread across the cells with the back edge of a landscape rake as understood by one of ordinary skill the art. For larger areas of interest, the particulate filler 2 may be transported and applied with a wheelbarrow. In other instances, a "cannon" that disperses rubber into the confinement structure 1 may be used as understood by one of ordinary skill the art.

Figure 3D:
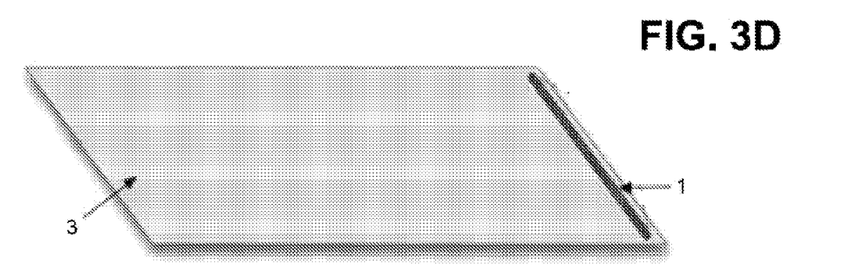
FIG. 3D also illustrates an exemplary step of the method for installing the system.
Figure 3E:
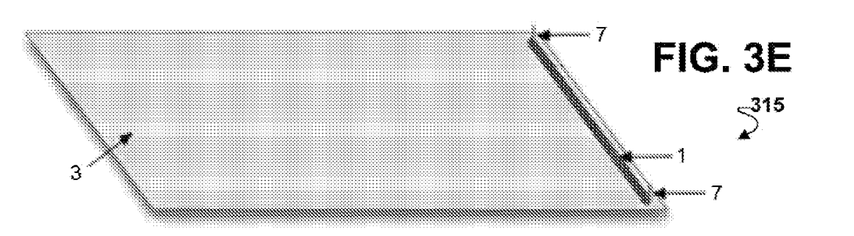
FIG. 3E also illustrates an exemplary step after the step of FIG. 3D of the method for installing the system.
Figure 3F:
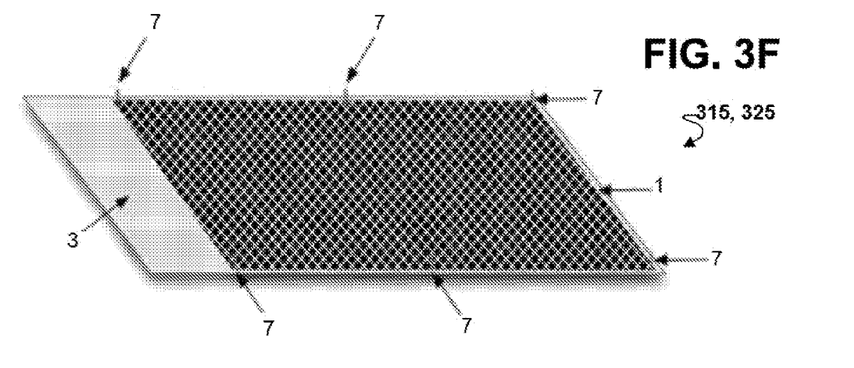
FIG. 3F also illustrates exemplary steps after the step of FIG. 3E of the method for installing the system.

FIGS. 3D-3F also illustrate some exemplary steps of a method 300 for installing the system 10. FIGS. 3E-3F illustrate steps 315 through step 325. In step 315 of FIG. 3E (See FIG. 3D which illustrates locations for the first two anchors 7), the ends of the confinement structure 1—before it is expanded—may be anchored with anchors 7. Each anchor 7 may comprise a long nail or a short pole. In step 325 of FIG. 3F, the remaining one or more ends of the confinement structure 1 may be anchored with the anchors 7.

As illustrated in FIG. 3F, the confinement structure 1 may secured every several feet. However, in many exemplary embodiments, this securing of the confinement structure 1 with this frequency of anchors 7 is only temporary as the anchors 7 should not be present in a "fall safe" areas, such as in children playgrounds. In some exemplary embodiments, the confinement structure 1 may be anchored close to the base 3, such as with landscape staples 6 where they are positioned low enough that they could remain in the base 3 after the turf 4 is secured to the nailer boards 5. In other embodiments, most of the anchors 7 for the confinement structure 1 may be removed after the turf 4 is secured.

Figure 3G:
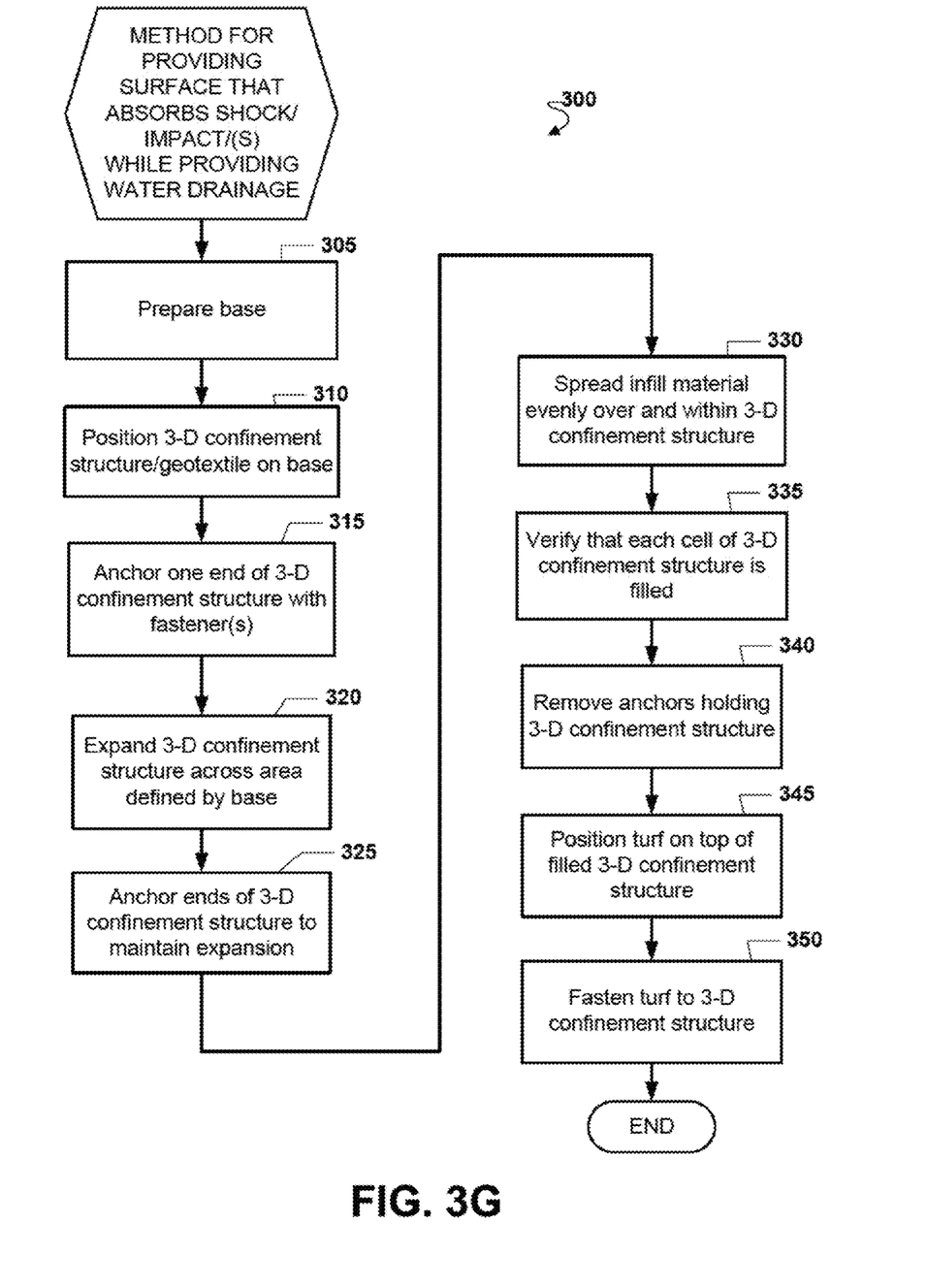
FIG. 3G is a flow chart illustrating an exemplary method for installing the system.

FIG. 3G is a flow chart illustrating an exemplary method 300 for installing the system 10. Step 305 may comprise the first step of the method 300. In step 305, the base 3 as illustrated in FIG. 1 and FIG. 3A may be prepared. As described previously, this step may include spreading the 0.25 crushed fine gravel or decomposed granite which may be added to a stabilized about 3.0 inches to about 4.0 inches sub-base. Step 305 in FIG. 3A corresponds with a worker taking an appropriate tool, such as a shovel rake, and spreading the material forming the base 3. Step 305 may also include spreading crushed gravel and compacting it to create a base 3 having a height of approximately 3.0 inches.

Subsequently, in step 310, the three-dimensional confinement structure 1 may be laid down across the area of interest defined by the base 3. Next, in step 315, one end of the confinement structure 1 may be anchored with nails or poles as illustrated in FIG. 3E.

In step 320, the confinement structure 1 may be spread out to cover the area of interest defined by the base 3 as illustrated in FIG. 3F. In step 325, one or more additional ends of the confinement structure 1 are anchored with nails or poles to remain in place over the area of interest.

Next, in step 330, the particulate filler 2 is spread across the area of interest and evenly into the confinement structure 1. A rake or a broom may be pulled across the confinement structure 1 in order to spread the particulate filler 2. The particulate filler 2 to be dropped into cells of the confinement structure that are below capacity and slide across cells that may be full. If needed, more particulate filler 2 may be added, and then raked or pulled across the confinement structure 1 in order to fill the cells of the confinement structure 1 that may have been low as illustrated in FIG. 3C.

In step 335, the contents of each cell of the confinement structure is checked for an adequate height for the particulate filler 2. Step 335 may be completed with foot traffic from workers as the confinement structure 1 is filled. Such foot traffic may compact and settle in the particulate filler 2 into each of the cells of the confinement structure 1. As appropriate, a power tamper may be used to further compact and settle the particulate filler 2 into the confinement structure 1.

In block 340, the anchors 7 of FIG. 3F may be removed from the confinement structure 1. Next, in step 345, a synthetic turf 4 for may be installed on top of the filled confinement structure 1. The turf 4 may be unrolled from storage rolls or unfolded.

Figure 2D:
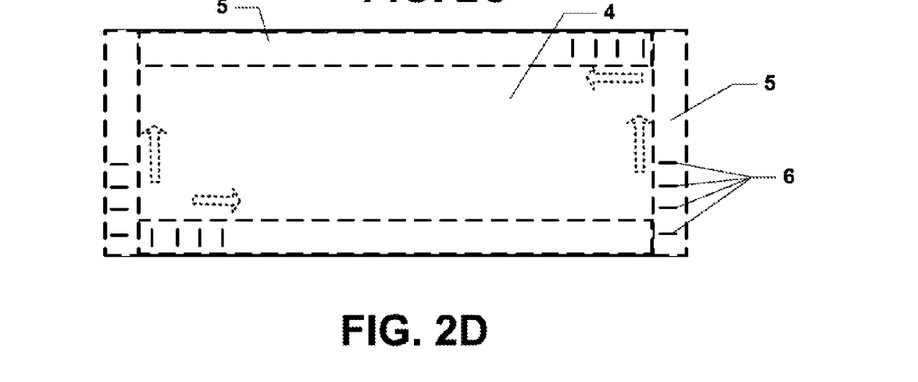
FIG. 2D illustrates a top or aerial view of FIG. 2C and how the synthetic turf may be fastened to a structure coupled to the confinement structure.

In step 350, the synthetic turf 4 may be secured to the confinement structure 1 using one or more various techniques. According to one exemplary embodiment, nailer boards 5 may be used to secure the synthetic turf 4 on top of the confinement structure 1 as illustrated in FIGS. 2C-2D. Alternatively, instead of using nailer boards 5 or perimeter anchor boards, the synthetic turf 4 may be filled with a ballast in order to weigh-down the synthetic turf for so that it remains on top of the confinement structure 1. The ballast may comprise at least one of sand, chunk rubber, or other particular matter as appropriate for synthetic turfs 4. The method 300 then ends.

Example of the Inventive System 10

A three dimensional cellular confinement structure 1, GroundGrid® Ground Stabilization System from DuPont, was laid down on a prepared base 4 and restrained on one end with vertically placed rods that extended above the top of the structure. The confinement structure 1 was stretched out to open the cells of the structure 1 and to cover the installation area that had an approximate size of about 4.0 Feet by about 25.0 Feet.

Chunk rubber particulate 2, having a diameter of about ⅜" (inch), was added to the open cells of the confinement structure 1 starting at the constrained end and working out to completely fill the three dimensional confinement structure 1. After the three dimensional confinement structure 1 was completely filled, the surface was tamped to consolidate particulate 2. Additional particulate 2 was added and smoothed to fill in to the top of the three dimensional confinement structure 1.

The vertically placed rods were removed. Synthetic turf 4, playground grass having product name of Forever Lawn Playground Grass Ultra and a thickness of approximately 1.875 inches (including backing), sold by Forever Lawn, Inc. located in Ohio, was installed on top of the particulate filled three dimensional confinement structure 1 and secured in place nailer boards.

Explanation of HIC Data

Figure 4:
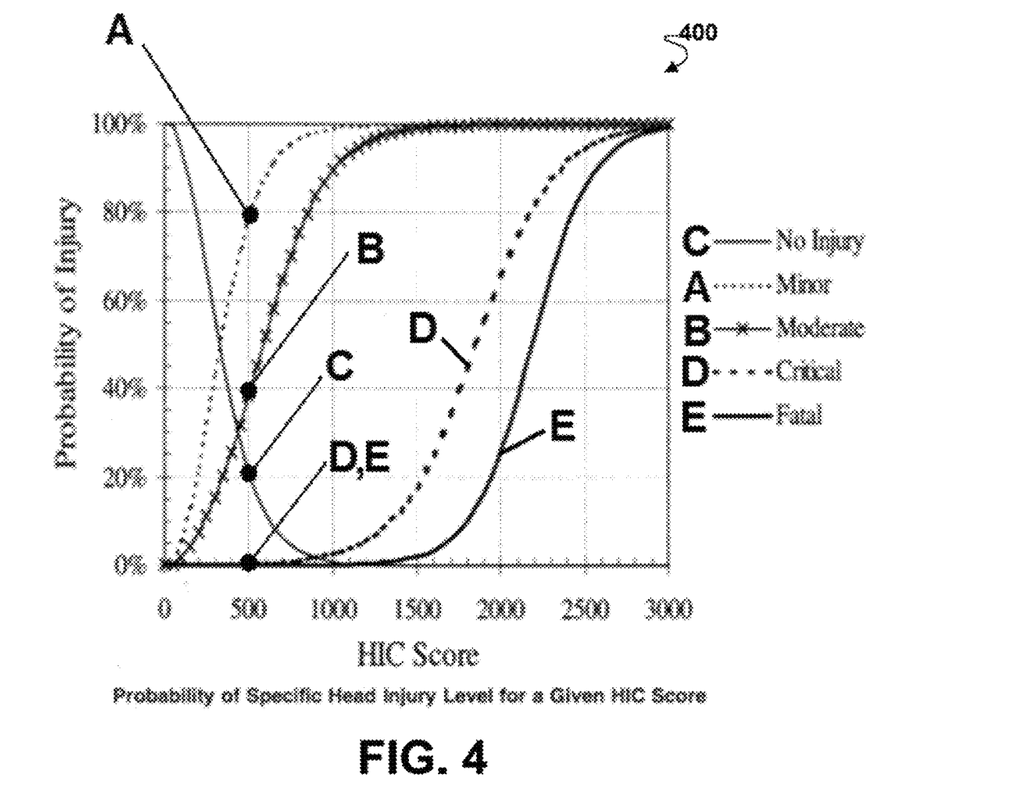
FIG. 4 is a chart illustrating Head Injury Criteria (HIC) corresponding to ASTM Standard Specification for Impact Attenuation of Surface Systems Under and Around Playground Equipment, ASTM F1292.

Referring now to FIG. 4, this figure illustrates a graph 400 listing the Head Injury Criteria (HIC) corresponding to the ASTM Standard Specification for Impact Attenuation of Surface Systems Under and Around Playground Equipment, ASTM F1292. If a person experiences a head impact equivalent to a HIC score of 500, then there is about a 79.0% chance (corresponding to point A which point also defines curve A on graph 400) that the person will likely suffer a minor injury.

In other words, after an HIC score is calculated from the standard, one reads the HIC score along the X-axis of graph 400 to see where the HIC score corresponding to the Y-axis intersects one of the five curved lines A-E.

At about 38.0% (corresponding to point B which point also defines curve B on graph 400), then there is the risk of a moderate injury (curve B) at this HIC level. The risk of this impact having an HIC score of 500 producing a severe or fatal head injury is very low (corresponding to points D, E on graph 400). Curve D defines critical head injuries while curve E defines fatal head injuries.

However, it is also noted that the chance of experiencing a 500 HIC score without suffering an injury of any kind is only about 21.0% (corresponding to point C which point also defines curve C on graph 400).

TABLE 2

|  | ASTM F1292 DATA FOR SAMPLES | | |
| --- | --- | --- | --- |
|  | GMax | HIC | Fall Height (ft) |
| Infill System, No Confinement Structure | 203 | 703 | 2 |
| 2" Height Confinement Structure | 120.0 | 755.0 | 8.0 |
| 4" Height Confinement Structure | 102.0 | 510.0 | 11.0 |

For the two inch and four inch sample in Table 2 above (which corresponds to the height of the confinement structure 1), the synthetic turf 4 had a height of approximately 1 and ⅞ths of an inch. However, the synthetic turf 4 may comprise a height dimension anywhere from about 1.0 inch up into an excess of about 2.0 inches as understood by one of ordinary skill in the art. Also, for these two samples, no ballast (no particulate or granules were spread within the synthetic turf 4) was utilized. Additionally, no base 3 was used for these two samples as required by ASTM 1292-04.

ASTM 1292-04 requires testing over a concrete surface so there was no base material 3 or one could state that the base was concrete for these two examples. The type of synthetic turf 4 which was utilized was the type sold under the name Playground Grass Ultra, by ForeverLawn, Inc. located in Ohio. The technical specifications for Playground Grass Ultra are listed in the last column of Table 1 provided above.

What is unexpected and surprising about the system 10 is that such a relatively simple system 10, as illustrated in FIG. 1A, may provide such adequate shock attenuation, stabilization and drainage for playgrounds, as evidenced by the ASTM F1292 data in Table 2 listed above. Specifically, a person of ordinary skill in the art would not have reasonably predicted the inventive system 10 yielding HIC scores between 510.0 and about 755.0 for simulated fall heights between about 8.0 and 11.0 feet, wherein the inventive system 10 comprises a confinement structure 1 having a vertical dimension of about ¼ (0.25) of an inch to about 5.0 inches), more preferably between about 2.0 and about 4.0 inches; synthetic turf 4 having a thickness that ranges between about 1.0 to about 3.0 inches, and more preferably about 1 and ⅞ths of an inch; a particulate filling material 2 comprising any type of elastomeric material such as styrene-butadiene rubber, butyl rubber, cis-polyisoprene rubber, neoprene rubber, nitrile rubber, ethylene propylene diene monomer, polyurethane, elastomeric polyester and other similar materials, and wherein the particulate filling material 2 may vary between about 4.0 to about 70.0 U.S. screen mesh size, and the filling material 2 preferably comprising chunk rubber with a diameter of about ⅜" (inch).

It is noted that in some conventional turf systems which have deflection layers, such layers may be a nonwoven or woven, however, they are generally laid flat. Meanwhile, the system 100 is dependent on the resilience of the nonwoven or woven material of the structure 1 to absorb shock. Conventional turf systems do not provide any teachings of resilient materials used for the particulate filler 2. The particulate filler 2 usually should have some resilient/elastomeric properties. The system 10 combines the function of a deflection layer and a flexible grid system.

The word "exemplary" is used herein to mean "serving as an example, instance, or illustration." Any aspect described herein as "exemplary" is not necessarily to be construed as preferred or advantageous over other aspects.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Although selected aspects have been illustrated and described in detail, it will be understood that various substitutions and alterations may be made therein without departing from the scope of the disclosure, as defined by the following claims.

What is claimed is:

1. A method for stabilizing synthetic turf comprising:
providing a three dimensional confinement structure comprising sub-assemblies, each sub-assembly made up of a plurality of interconnected open cells of fabric material that are open in the vertical dimension;
providing an elastomeric particulate filling material that vertically fills the three dimensional confinement structure;
providing a mechanical structure defining a perimeter of an area in which the three dimensional confinement structure is placed;
placing a synthetic turf on top of the filled three dimensional confinement structure; and
rigidly and fixedly attaching the synthetic turf to the mechanical structure with fasteners, the mechanical structure keeping the synthetic turf in a stretched state such that synthetic turf completely covers the three dimensional confinement structure within the area.

2. The method of claim 1, wherein the three dimensional confinement structure has a vertical dimension of about 0.25 inches to about 5.0 inches.

3. The method of claim 2, wherein the synthetic turf has a thickness that ranges between about 1.0 inch and about 3.0 inches.

4. The method of claim 3, wherein the elastomeric particulate filling material comprises at least one of: an elastomeric material, styrene-butadiene rubber, butyl rubber, cis-polyisoprene rubber, neoprene rubber, nitrile rubber, ethylene propylene diene monomer, polyurethane, and an elastomeric polyester.

* * * * *